US011528377B2

(12) United States Patent
Morimoto et al.

(10) Patent No.: US 11,528,377 B2
(45) Date of Patent: Dec. 13, 2022

(54) DOCUMENT FEEDER AND IMAGE FORMING APPARATUS

(71) Applicant: SHARP KABUSHIKI KAISHA, Sakai (JP)

(72) Inventors: Yasumasa Morimoto, Sakai (JP); Shohichi Fukutome, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/351,728

(22) Filed: Jun. 18, 2021

(65) Prior Publication Data

US 2022/0021776 A1 Jan. 20, 2022

(30) Foreign Application Priority Data

Jul. 20, 2020 (JP) .............................. JP2020-123808

(51) Int. Cl.
*H04N 1/00* (2006.01)
(52) U.S. Cl.
CPC ..... *H04N 1/00649* (2013.01); *H04N 1/00604* (2013.01); *H04N 1/00708* (2013.01); *H04N 1/00718* (2013.01); *H04N 2201/0094* (2013.01)
(58) Field of Classification Search
CPC .......... B65H 2511/11; B65H 2511/514; B65H 2513/50; B65H 2701/1313; B65H 7/18; B65H 2701/1311; B65H 2801/39; B65H 3/0684; B65H 2513/514; B65H 3/0607; B65H 7/14; B65H 2220/01; B65H 2220/02; B65H 2220/03; B65H 2511/414; B65H 2220/11; B65H 2404/6111; B65H 2511/20; B65H 2513/40; B65H 2513/512; B65H 2551/14; B65H 2801/06; B65H 3/5261; B65H 5/062; H04N 1/00708; H04N 2201/0094; H04N 1/00588; H04N 1/00779; H04N 1/00602; H04N 1/00474;
(Continued)

(56) References Cited

U.S. PATENT DOCUMENTS 5,347,352 A * 9/1994 Morigami .............. G03G 15/65
399/363
9,906,670 B2 * 2/2018 Hayashi ............. H04N 1/00588
(Continued)

FOREIGN PATENT DOCUMENTS

JP 2003-137459 A 5/2003
JP 2013-163596 A 8/2013

*Primary Examiner* — Negussie Worku
(74) *Attorney, Agent, or Firm* — ScienBiziP, P.C.

(57) ABSTRACT

A document feeder includes a mode selector, at least two document sensors, and a feeding determiner. The mode selector receives selection of either a normal mode for feeding documents having the same size or a mixed loading mode for feeding documents having different sizes. The document sensors are arranged at an interval in a width direction of the documents, and detect the documents. The feeding determiner performs, based on results of the detection by the document sensors, a size determination to determine a size of a document being fed and a skew determination to determine whether or not the document being fed is skewed. The feeding determiner performs the skew determination when the normal mode has been selected and performs the size determination when the mixed loading mode has been selected.

7 Claims, 10 Drawing Sheets

(58) Field of Classification Search
CPC ............. H04N 1/00477; H04N 1/0057; H04N 1/00745; H04N 1/00; H04N 1/0062; H04N 1/00713; H04N 1/00718; H04N 1/0074; H04N 1/047; H04N 1/233; H04N 1/32673; H04N 1/00525; H04N 1/00567; H04N 1/00572; H04N 1/00591; H04N 1/0061; H04N 1/00612; H04N 1/00631; H04N 1/0464; H04N 1/1013; H04N 1/12; H04N 1/193; H04N 1/00628; H04N 1/00681; H04N 1/0071; H04N 1/00726; H04N 1/00758; H04N 1/00771; H04N 1/00864; H04N 1/00917; H04N 1/121; H04N 1/3263; H04N 1/3875; G03G 15/607; G03G 15/60; G03G 15/5016; G03G 15/5029; G03G 15/55; G03G 15/6567; G03G 2215/00316; G03G 15/602; G03G 2215/00329

USPC ........................................................ 358/1.15
See application file for complete search history.

(56) References Cited

U.S. PATENT DOCUMENTS

| | | | |
|---|---|---|---|
| 11,095,789 B2* | 8/2021 | Nishiyama | H04N 1/00779 |
| 11,142,417 B2* | 10/2021 | Matsumura | B65H 1/04 |
| 2013/0321886 A1* | 12/2013 | Adachi | H04N 1/00689 |
| | | | 358/498 |
| 2016/0261758 A1* | 9/2016 | Kimura | H04N 1/00721 |
| 2016/0282792 A1* | 9/2016 | Nakata | B65H 9/006 |
| 2020/0076975 A1* | 3/2020 | Nishiyama | H04N 1/00779 |
| 2020/0213463 A1* | 7/2020 | Seto | G06V 30/40 |
| 2021/0112171 A1* | 4/2021 | Tachibana | B65H 3/0684 |
| 2021/0168256 A1* | 6/2021 | Oka | H04N 1/00628 |
| 2021/0195051 A1* | 6/2021 | Takahashi | H04N 1/3878 |
| 2022/0060590 A1* | 2/2022 | Hiro | H04N 1/00716 |

* cited by examiner

DOCUMENT FEEDER AND IMAGE FORMING APPARATUS

BACKGROUND OF THE INVENTION

Field of the Invention

The present invention relates to a document feeder that feeds a document on a paper sheet feeding tray and to an image forming apparatus.

Description of the Background Art

Conventionally, a document feeder in an image forming apparatus picks up a document loaded on a paper sheet feeding tray, reads the document, and then discharges the document onto a catch tray. Some document feeders adopt a different width mixed loading mode that allows mixed loading of documents having different sizes on a paper sheet feeding tray and feeding of such documents (see, for example, Japanese Unexamined Patent Application Publication No. 2013-163596 and Japanese Unexamined Patent Application Publication No. 2003-137459).

An image forming apparatus disclosed in Japanese Unexamined Patent Application Publication No. 2013-163596 includes: a sheet loading device on which sheets (documents) are loaded; a pair of cursors that align the sheets widthwise; a pair of sheet feeding devices that feed the sheets one sheet at a time; and a pair of separation devices disposed with the sheet feeding devices therebetween. In this image forming apparatus, one of the separation devices is retracted from a feeding path during a different width mixed loading mode.

An image forming apparatus disclosed in Japanese Unexamined Patent Application Publication No. 2003-137459 includes: a loading device on which recording mediums (documents) are loaded; a transportation device that transports the recording mediums to a reading position; a registration device that receives the recording mediums while being temporarily stopped, performs de-skewing, and transports the recording mediums; and a different with mixed loading information device that notifies of different width mixed loading. This image forming apparatus increases the amount of feeding of the recording mediums to the registration device in the case of the different width mixed loading.

The above-described image forming apparatus performs de-skewing while transporting a skewed document. However, de-skewing can be difficult depending on the degree of skew and can end up with a paper jam. It is therefore preferable to stop transporting a document if the document is skewed beyond a skew limit. To this end, it is desired to detect document skew using, for example, a sensor. In a case where documents having different widths are loaded, it is preferable to perceive the size of each document. To this end, it is desired to detect document size using, for example, a sensor.

Providing separate sensors for detecting document skew and for detecting document size increases the number of components, posing concerns about an increase in size of the apparatus and an increase in cost.

The present invention has been made in order to solve the problems described above, and an object thereof is to provide a document feeder and an image forming apparatus that are enabled to perform appropriate determinations without increasing the number of components.

SUMMARY OF THE INVENTION

A document feeder according to the present invention feeds a document on a paper sheet feeding tray and includes: a mode selector that receives selection of either a normal mode for feeding documents having the same size or a mixed loading mode for feeding documents having different sizes; at least two document sensors that detect the documents, the document sensors being arranged at an interval in a width direction of the documents; and a feeding determiner that performs, based on results of the detection by the document sensors, a size determination to determine a size of a document being fed and a skew determination to determine whether or not the document being fed is skewed, wherein the feeding determiner performs the skew determination when the normal mode has been selected and performs the size determination when the mixed loading mode has been selected.

The document feeder according to the present invention may have a configuration in which the feeding determiner performs the skew determination as well as the size determination when the mixed loading mode has been selected.

The document feeder according to the present invention may have a configuration in which the feeding determiner acquires a detection time taken to detect the document being fed by each of the document sensors, and the document being fed is determined to be skewed in the skew determination if a difference in the detection time detected by the document sensors is greater than a threshold value.

The document feeder according to the present invention may have a configuration in which in the size determination, the size of the document being fed is distinguished in accordance with a plurality of levels based on a position of any of the document sensors that has detected the document.

The document feeder according to the present invention may have a configuration in which the document sensors are arranged on a straight line extending in the width direction.

The document feeder according to the present invention may have a configuration in which the document sensors are disposed in positions that are different in a feeding direction of the documents, and the feeding determiner acquires a detection time taken to detect the document being fed by each of the document sensors and corrects the detection time based on the positions of the document sensors in the feeding direction.

An image forming apparatus according to the present invention includes the document feeder according to the present invention.

According to the present invention, it is possible to perform appropriate determinations according to the selected mode without increasing the number of document sensors by using the same document sensors both for the size determination and the skew determination.

DESCRIPTION OF THE PREFERRED EMBODIMENTS

First Embodiment

The following describes an image forming apparatus according to a first embodiment of the present invention with reference to the accompanying drawings.

Figure 1:
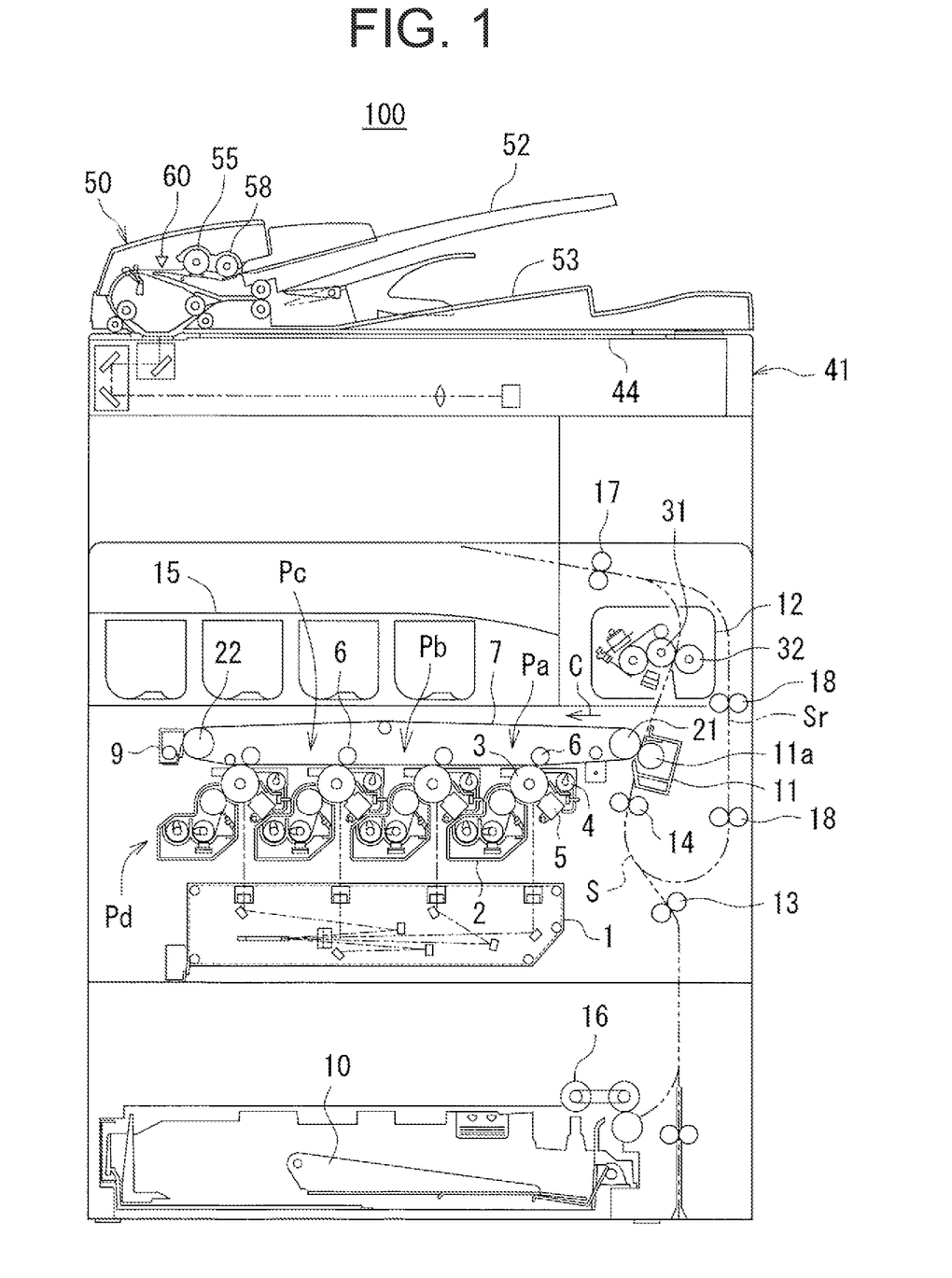
FIG. 1 is a schematic side view of an image forming apparatus according to a first embodiment of the present invention.

FIG. 1 is a schematic side view of the image forming apparatus according to the first embodiment of the present invention.

An image forming apparatus 100 is a multifunction peripheral having multiple functions such as a scanner function, a copier function, a printer function, and a facsimile function. The image forming apparatus 100 transmits an image of a document read by an image reader 41 to an external destination (corresponding to the scanner function). The image forming apparatus 100 also forms a color or monochrome image on paper based on an image of a read document or an image received from an external source (corresponding to the copier function, the printer function, and the facsimile function).

A document feeder (ADF) 50 is provided above the image reader 41, and supported so as to be openable and closable relative to the image reader 41. When the document feeder 50 is open, a document table 44 in an upper portion of the image reader 41 is exposed to allow a document to be manually loaded thereon. The document feeder 50 also automatically feeds a document loaded thereon onto the image reader 41. The image reader 41 reads the document loaded thereon or the document fed from the document feeder 50 and generates image data.

The document feeder 50 includes a paper sheet feeding tray 52 on which a document is loaded, a catch tray 53 to which the document is discharged, a pickup roller 58 that sends the document on the paper sheet feeding tray 52 into a document transport path, a paper sheet feeding roller 55 that sends the document picked up by the pickup roller 58 to a downstream transport roller, and an open/close cover 51 that is attached to a document feeder main body and that is openable and closable relative to the document feeder main body. The document transport path is exposed when the open/close cover 51 is open. The document transport path is provided with document sensors 60 that detect a document. It should be noted that the document feeder 50 will be described in detail with reference to FIGS. 2 and 3 described below.

The image forming apparatus 100 includes components such as an optical scanning device 1, developing devices 2, photosensitive drums 3 (example of photoconductors), drum cleaners 4, chargers 5, an intermediate transfer belt 7, a fixing device 12, a paper transport path S, a paper sheet feeding cassette 10, and a loading tray 15.

The image forming apparatus 100 handles image data for a color image having different colors including black (K), cyan (C), magenta (M), and yellow (Y) or a monochrome image having a single color (for example, black). In order to form four toner images, the image forming apparatus 100 includes four developing devices 2, four photosensitive drums 3, four drum cleaners 4, and four chargers 5, which correspond to the four colors including black, cyan, magenta, and yellow, and form four image stations Pa, Pb, Pc, and Pd.

Each of the drum cleaners 4 removes and collects residual toner on a surface of the corresponding photosensitive drum 3. Each of the chargers 5 uniformly charges the surface of the corresponding photosensitive drum 3 to a predetermined potential. The optical scanning device 1 exposes the surface of each of the photosensitive drums 3 to light to form an electrostatic latent image. Each of the developing devices 2 develops the electrostatic latent image on the surface of the corresponding photosensitive drum 3 to form a toner image on the surface of the photosensitive drum 3. Toner images in the different colors are formed on the surfaces of the respective photosensitive drums 3 through the series of operations described above.

Intermediate transfer rollers 6 are disposed above the respective photosensitive drums 3 with the intermediate transfer belt 7 therebetween. The intermediate transfer belt 7 is wound around a transfer drive roller 21 and a transfer driven roller 22, and moves to rotate in a direction indicated by an arrow C. Meanwhile, a belt cleaner 9 removes and collects residual toner, and the toner images in the respective colors formed on the surfaces of the respective photosensitive drums 3 are sequentially transferred onto a surface of the intermediate transfer belt 7 and superimposed on one another. Thus, a color toner image is formed on the surface of the intermediate transfer belt 7.

The intermediate transfer belt 7 and a transfer roller 11a of a secondary transfer device 11 form a nip region (secondary transfer position) therebetween. The transfer roller 11a uses the nip region to nip paper transported thereto through the paper transport path S, and thus further transports the paper. The paper passing through the nip region receives the toner image transferred from the surface of the intermediate transfer belt 7, and then is transported to the fixing device 12.

The fixing device 12 includes a fixing roller 31 and a pressure roller 32 that rotate while holding the paper therebetween. The fixing device 12 applies heat and pressure to the paper having the toner image transferred thereto by holding the paper between the fixing roller 31 and the pressure roller 32 to fix the toner image to the paper.

The paper sheet feeding cassette 10 is provided below the optical scanning device 1 to store therein paper to be used for image formation. The paper is picked up from the paper sheet feeding cassette 10 by a paper pickup roller 16, transported through the paper transport path S while going through the secondary transfer device 11 and the fixing device 12, and discharged onto the loading tray 15 by paper ejection rollers 17. Along the paper transport path S, paper registration rollers 14, transport rollers 13, and the paper ejection rollers 17 are disposed. The paper registration rollers 14 temporarily stop the paper, adjust orientation of a leading edge of the paper, and then start transporting the paper in time for the transfer of the color toner image in the nip region between the intermediate transfer belt 7 and the transfer roller 11*a*. The transport rollers 13 assist with the transport of the paper.

In a case where image formation is performed on a back side of the paper in addition to a front side of the paper, the paper is reversely transported from the paper ejection rollers 17 into a paper inverting path Sr. In the paper inverting path Sr, the sides of the paper are inverted by inverting rollers 18, and the paper is guided back to the paper registration rollers 14. Thereafter, image formation is performed on the back side in the same manner as on the front side, and the paper is transported and discharged onto the loading tray 15.

A touch panel, which is an example of a display device, is attached to a housing of the image forming apparatus 100. The touch panel receives input from a user and displays settings related to image formation. It should be noted that the display device is not limited to the touch panel, and may alternatively include buttons and a separate display.

Figure 2:
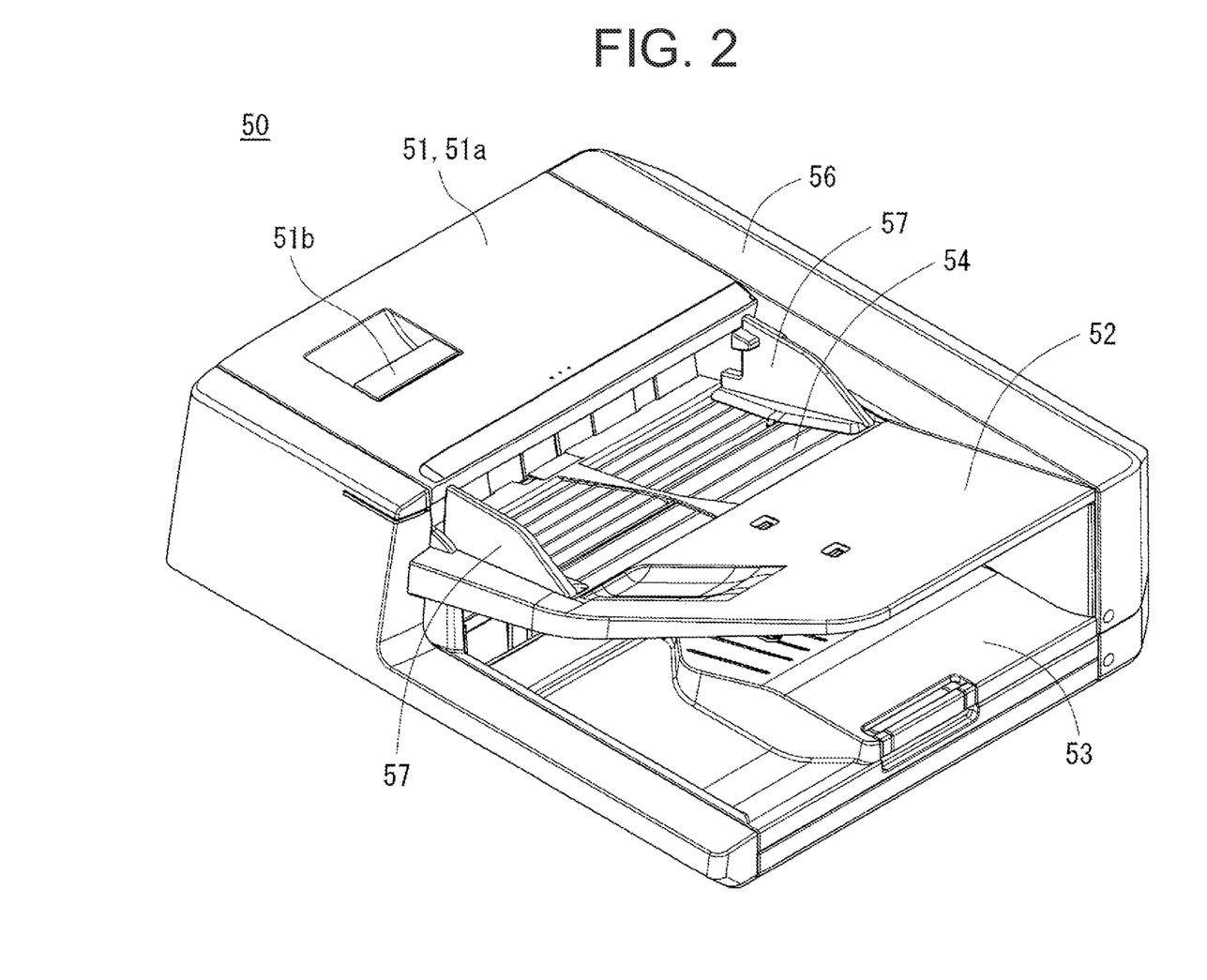
FIG. 2 is a perspective view of a document feeder according to the first embodiment of the present invention.

FIG. 2 is a perspective view of the document feeder 50 according to the first embodiment of the present invention.

The document feeder 50 has the open/close cover 51 at one end (upper left end in FIG. 2), and has the paper sheet feeding tray 52 and the catch tray 53 at an opposite end (lower right end in FIG. 2). The paper sheet feeding tray 52 and the catch tray 53 are disposed over one another in a height direction, with the paper sheet feeding tray 52 located above the catch tray 53. Under the open/close cover 51 in a closed state, the paper sheet feeding roller 55 and the pickup roller 58 are provided.

The paper sheet feeding tray 52 is downwardly inclined toward an end thereof opposed to the open/close cover 51. That is, the paper sheet feeding tray 52 has an inclination that causes a document loaded thereon to slide toward the open/close cover 51, and thus facilitates transport of the document. A paper sheet feeding guide plate 54 is provided at the end of the paper sheet feeding tray 52 that is opposed to the open/close cover 51. The paper sheet feeding guide plate 54 lifts a leading edge of the document loaded thereon to cause the leading edge to abut the paper sheet feeding roller 55. Specifically, the paper sheet feeding guide plate 54 in a lowered state has the substantially same inclination as the paper sheet feeding tray 52. The paper sheet feeding guide plate 54 lifts the leading edge of the document by changing the inclination so as to raise an end thereof adjacent to the open/close cover 51.

The paper sheet feeding tray 52 also has document guides 57 for aligning edges of documents in a width direction W. The document guides 57 are provided at the end opposed to the open/close cover 51 in two respective positions spaced from each other in the width direction W. The document guides 57 are movable in the width direction W. Positioning of a document loaded on the paper sheet feeding tray 52 in the width direction W is achieved by placing the document between the document guides 57 in the two respective positions and moving the document guides 57 to positions where the document guides 57 respectively make contact with opposite edges of the document in the width direction W. Furthermore, a portion of the document feeder 50 that faces toward the paper sheet feeding guide plate 54 forms a wall stood in the height direction, and positioning of the document in a feeding direction H is achieved by causing a leading edge of the document to abut the wall.

The open/close cover 51 includes an upper housing 51*a* that covers a surface of the document feeder 50 when the open/close cover 51 is closed, a lower housing 51*c* (see FIG. 3 described below) that surrounds the inside of the document feeder 50, and a handgrip 51*b* for a user to grasp when opening and closing the open/close cover 51. The handgrip 51*b* is movable when grasped by a user. The open/close cover 51 is disengaged from the document feeder main body as a result of the handgrip 51*b* being moved. The open/close cover 51 may have a spring or the like attached thereto that biases the open/close cover 51 in a direction for opening the open/close cover 51 upon the disengagement from the document feeder main body.

The document feeder 50 is provided with a driver 56. The driver 56 contains, for example, a motor, gears, a belt, and a clutch, and has a mechanism that generates driving force and transmits the driving force to some components. It should be noted that the driver 56 may include other members, and the design thereof may be changed as appropriate according to components that use the driving force from the driver 56.

Figure 3:
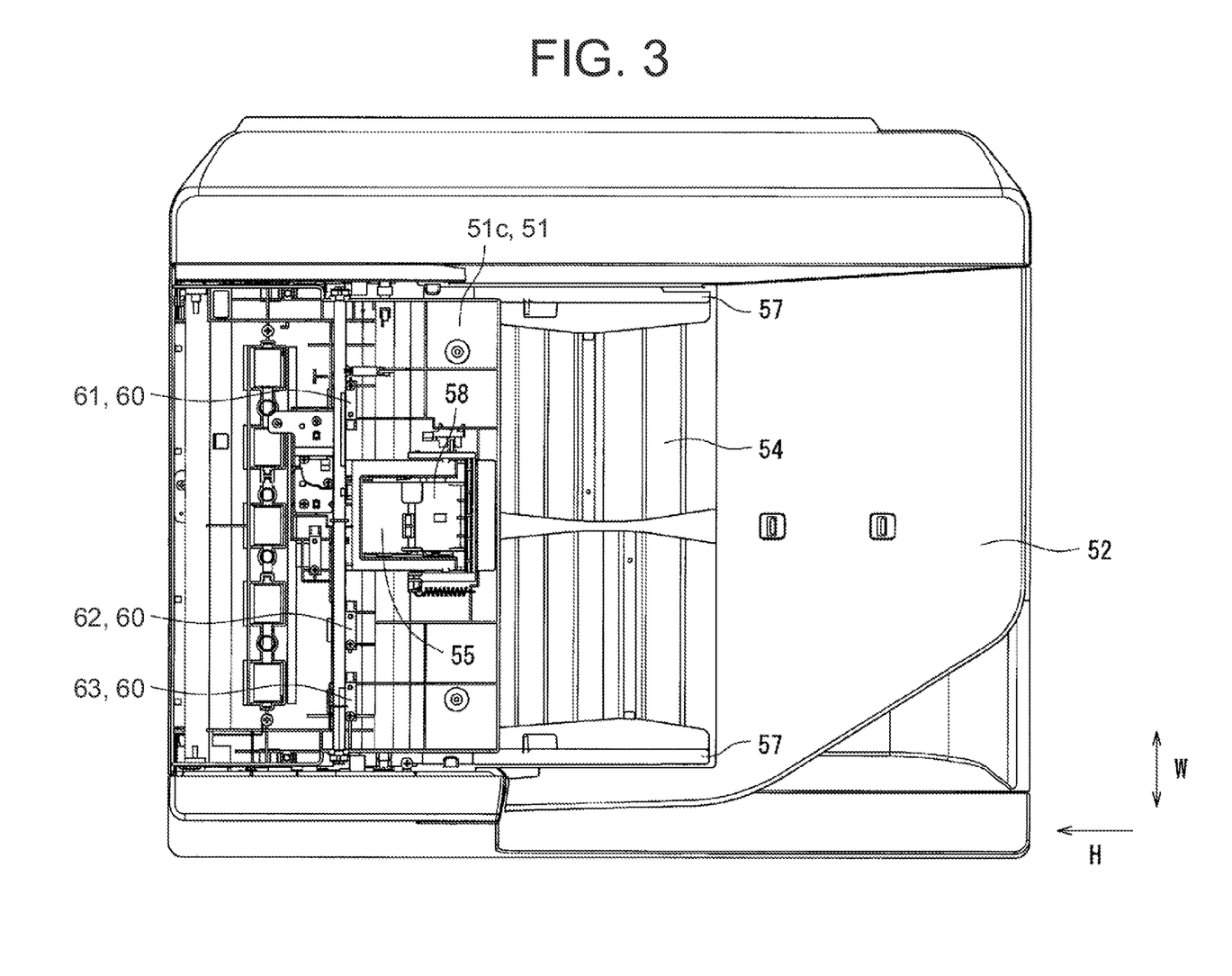
FIG. 3 is a plan view of the document feeder in FIG. 2 without an upper housing.

FIG. 3 is a plan view of the document feeder 50 in FIG. 2 without the upper housing.

The document sensors 60 that detect a document passing thereunder are attached to the lower housing 51*c* of the open/close cover 51. The present embodiment includes three document sensors 60 (a first document sensor 61, a second document sensor 62, and a third document sensor 63), which are located slightly downstream of the paper sheet feeding roller 55 in the feeding direction H.

The paper sheet feeding roller 55 is rotatably supported by a paper sheet feeding shaft connected to the driver 56, and a position of the paper sheet feeding roller 55 in the width direction W corresponds to a center and the vicinity thereof of the paper sheet feeding tray 52 in the width direction W. The three document sensors 60 are arranged at an interval in the width direction W in the order of the first document sensor 61, the second document sensor 62, and the third document sensor 63 from one end (upper end in FIG. 3) in the width direction W. The paper sheet feeding roller 55 described above is located between the first document sensor 61 and the second document sensor 62. That is, the first document sensor 61 and the third document sensor 63 are respectively disposed in positions corresponding to edges and the vicinities thereof of a document having the largest size among documents that can be fed by the document feeder 50. The second document sensor 62 is disposed in a position closer to the center in the width direction W than the position of the third document sensor 63.

Figure 4:
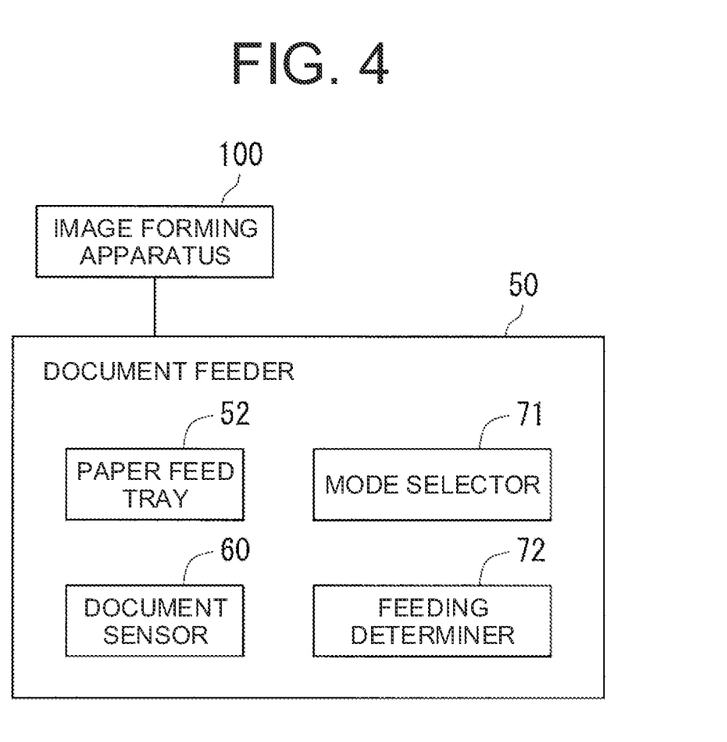
FIG. 4 is a schematic configuration diagram illustrating an overview of the document feeder according to the first embodiment of the present invention.

FIG. 4 is a schematic configuration diagram illustrating an overview of the document feeder 50 according to the first embodiment of the present invention.

FIG. 4 selectively shows the paper sheet feeding tray 52, the document sensors 60, a mode selector 71, and a feeding determiner 72 as main members of the document feeder 50. However, the document feeder 50 is not limited to this illustration and may include other members.

The document feeder 50 has a central processing unit (CPU) storing therein the mode selector 71 and the feeding determiner 72 as a prestored program, and performs processes described below through execution of the program.

The mode selector 71 receives input from a user and selects either a normal mode for feeding documents having the same size or a mixed loading mode for feeding documents having different sizes.

The feeding determiner 72 performs a size determination to determine the size of a document being fed and a skew determination to determine whether or not the document being fed is skewed, based on results of the detection by the plurality of document sensors 60.

Figure 5:
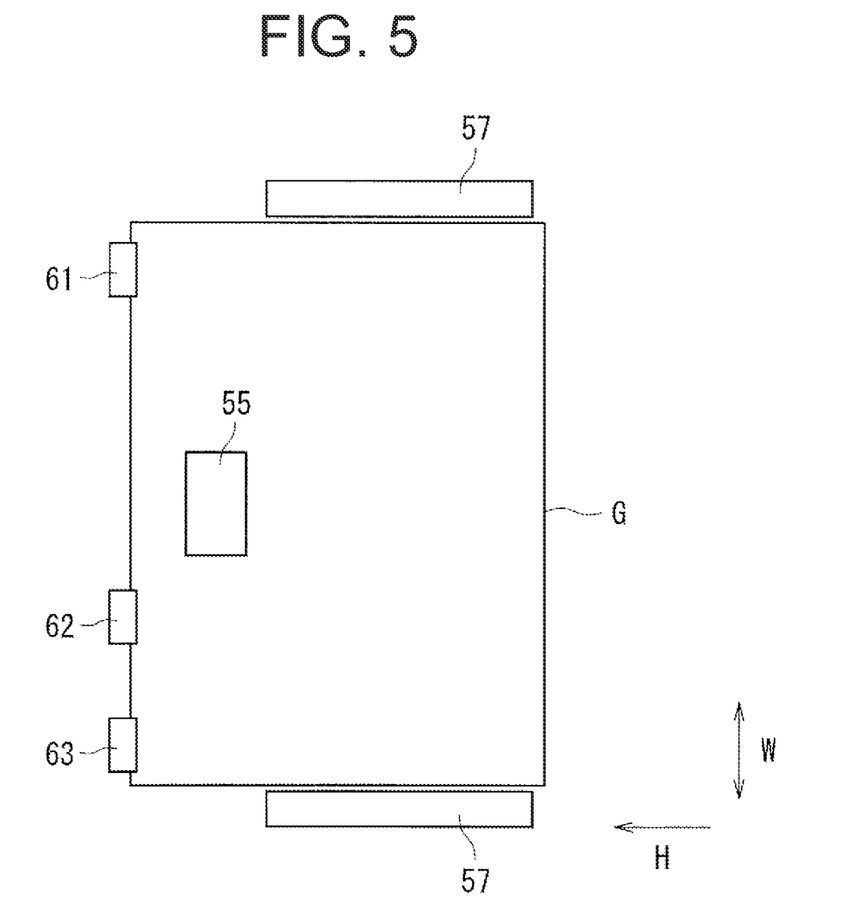
FIG. 5 is a schematic explanatory diagram illustrating a state in which a document is being fed in a normal manner.
Figure 6:
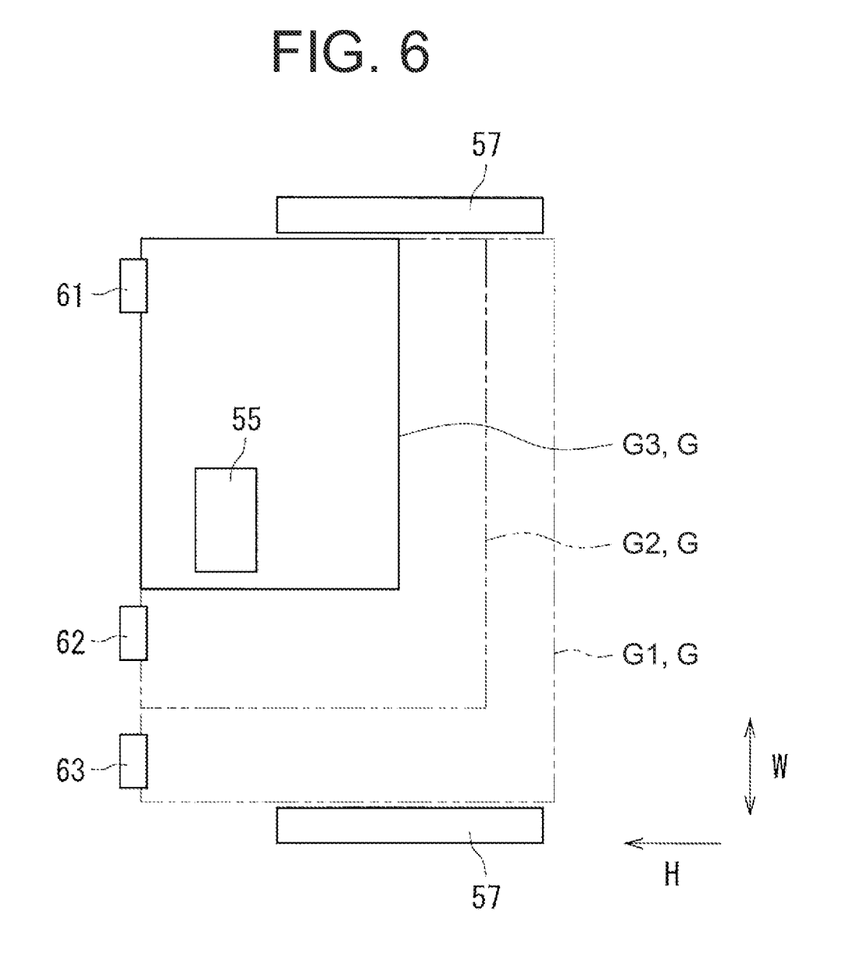
FIG. 6 is a schematic explanatory diagram illustrating a size determination for a document.
Figure 7:
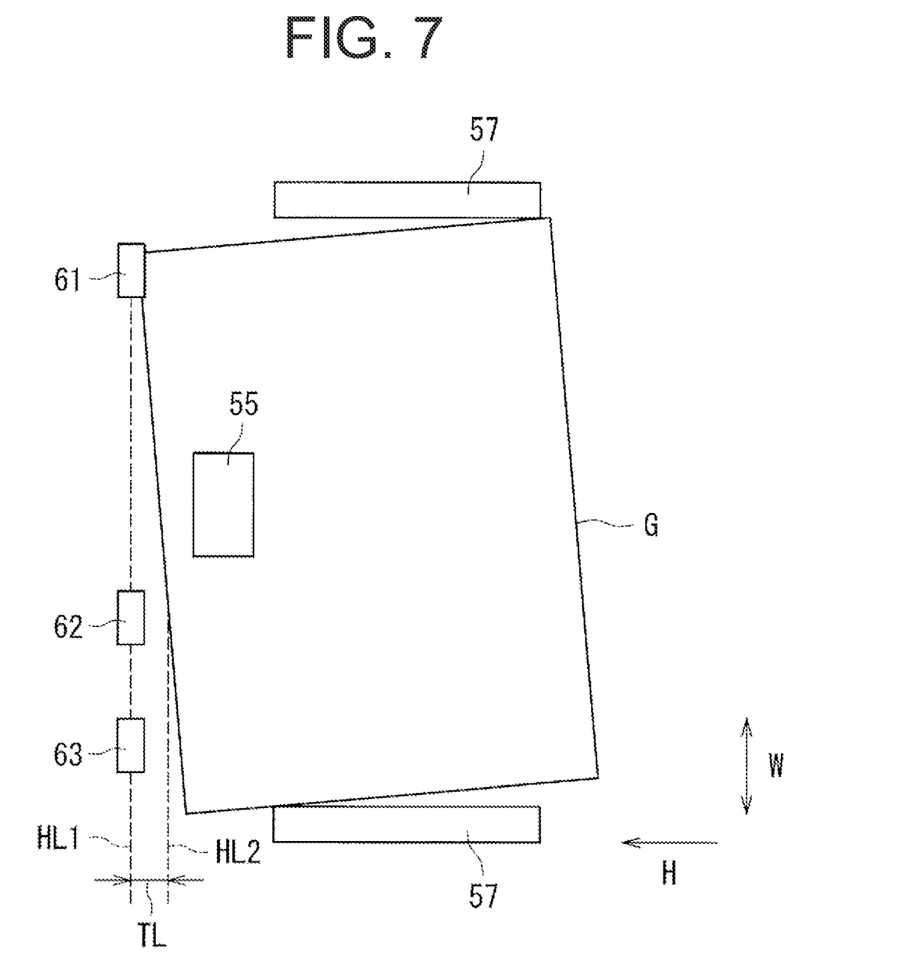
FIG. 7 is a schematic explanatory diagram illustrating a skew determination for a document.

The following describes the size determination and the skew determination to be performed by the document feeder 50 with reference to FIGS. 5 to 7. In consideration of drawing legibility, FIGS. 5 to 7, which illustrate the paper sheet feeding roller 55 and the vicinity thereof, selectively show the document sensors 60 and the document guides 57, and omit the other components.

FIG. 5 is a schematic explanatory diagram illustrating a state in which a document is being fed in a normal manner.

In the state illustrated in FIG. 5, a document G having the largest size (first-size document G1 illustrated in FIG. 6) is being fed among documents that can be fed by the document feeder 50. The first document sensor 61, the second document sensor 62, and the third document sensor 63 detect a leading edge of the document G substantially at the same time. The feeding determiner 72 acquires a detection time taken to detect the document by each of the document sensors 60. The detection time is a period of time from a reference time to a time at which the document sensor 60 detects the document. The reference time to be used by the feeding determiner 72 may be, for example, a time at which the paper sheet feeding roller 55 starts feeding the document or a time at which any of the document sensors 60 detects the document. In the present embodiment, the detection time of the first document sensor 61 is t1, the detection time of the second document sensor 62 is t2, and the detection time of the third document sensor 63 is t3.

FIG. 6 is a schematic explanatory diagram illustrating the size determination for a document.

In a state illustrated in FIG. 6, a document G having the smallest size (referred to below as a third-size document G3) is being fed among documents that can be fed by the document feeder 50. Furthermore, for comparison of sizes of documents G, FIG. 6 shows the document G having the largest size (first-size document G1) and a document G (second-size document G2) that is smaller than the first-size document G1 and larger than the third-size document G3 as documents G having different sizes using dashed and double dotted lines. In the case of the mixed loading mode of the present embodiment, positioning of documents is achieved through edges of the documents moving along one (upper one in FIG. 6) of the document guides 57 (based on one side).

With respect to the first-size document G1, as described above, the first document sensor 61, the second document sensor 62, and the third document sensor 63 detect the leading edge of the document G. With respect to the second-size document G2, the first document sensor 61 and the second document sensor 62 detect the leading edge of the document G. With respect to the third-size document G3, the first document sensor 61 detects the leading edge of the document G. As such, in the size determination, the size of the document G is distinguished in accordance with a plurality of levels based on the position of any of the document sensors 60 that has detected the document G. Perceiving which of the document sensors 60 has detected the document G allows for determination of the size of the document G corresponding to the position of the document sensor 60.

The present embodiment has been described using a configuration including three document sensors 60. However, the present embodiment is not limited as such and may include four or more document sensors 60 to provide more levels for distinguishing the size of the document G. The present embodiment may alternatively have a configuration including two document sensors 60. For example, in a configuration only including the first document sensor 61 and the third document sensor 63, the document G can be determined to be the first-size document G1 or a document G smaller than the first-size document G1.

FIG. 7 is a schematic explanatory diagram illustrating the skew determination for a document.

In a state illustrated in FIG. 7, the document G being fed is skewed. The first document sensor 61, the second document sensor 62, and the third document sensor 63 in the present embodiment are arranged on a straight line (first auxiliary line HL1) extending in the width direction W. This arrangement enables the document sensors 60 to detect the document G at the same time, making it possible to easily determine whether or not the document G is being fed in a normal manner. Since the leading edge of the document G in the state illustrated in FIG. 7 is at an angle to the straight line, the second document sensor 62 and the third document sensor 63 are still to detect the leading edge of the document G when the first document sensor 61 detects the leading edge of the document G. A second auxiliary line HL2 shown in FIG. 7 depicts a straight line extending in the width direction W and intersecting the leading edge of the document G at a point corresponding to the second document sensor 62. That is, a distance (delay distance TL) between the first auxiliary line HL1 and the second auxiliary line HL2 in the feeding direction H represents a distance of a shift of the leading edge of the document G between the first document sensor 61 and the second document sensor 62. As such, the first document sensor 61 and the second document sensor 62 have a difference in the detection time corresponding to the delay distance TL.

In the skew determination, the document G is determined to be skewed if the difference in the detection time detected by the document sensors 60 is greater than a threshold value. In a case shown in FIG. 7, for example, "|t1−t2|" is calculated as the difference in the detection time, and it is determined whether or not the difference is greater than a skew threshold value to (threshold value). As described above, it is possible to perceive whether or not the document G is skewed through the determination based on a difference between times when the respective document sensors 60 arranged at an interval in the width direction W detect the document G. Upon the document G being determined to be skewed, the feeding of the document G is immediately discontinued.

Figure 8:
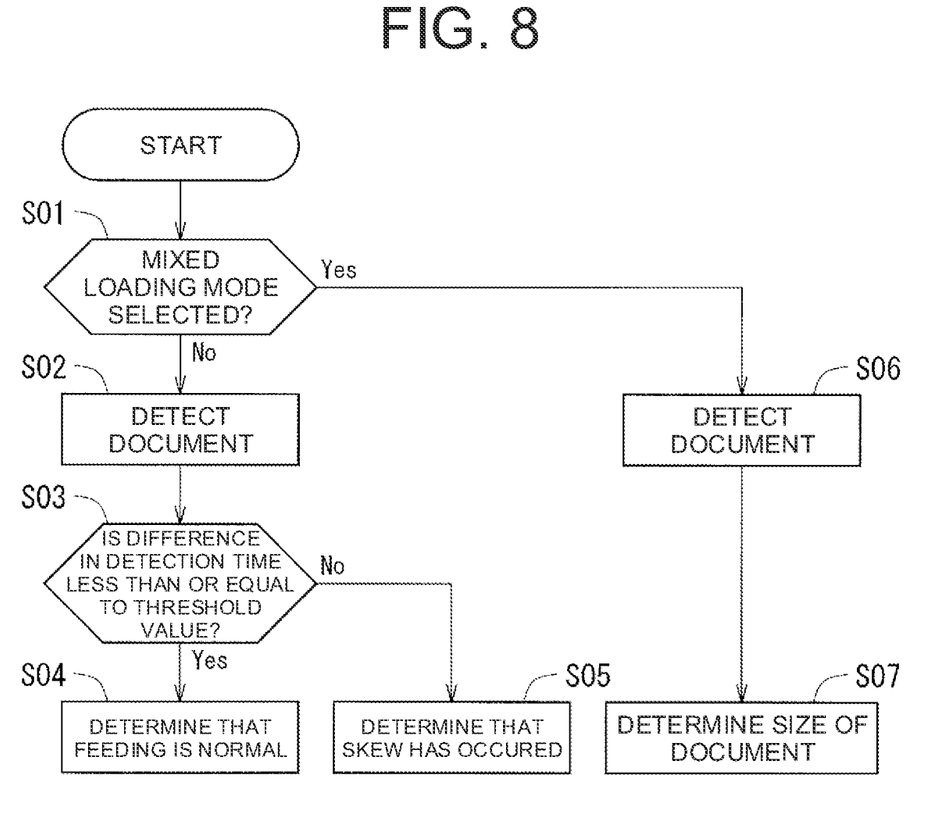
FIG. 8 is a flow chart showing a flow of a process to be performed when the document feeder feeds a document.

The following describes a flow of a process to be performed when the document feeder 50 feeds the document G with reference to FIG. 8.

FIG. 8 is a flow chart showing the flow of the process to be performed when the document feeder 50 feeds a document.

In FIG. 8, the document feeder 50 is in an initial state when the paper sheet feeding roller 55 starts feeding the document G.

In step S01, the feeding determiner 72 determines whether or not the mixed loading mode has been selected. The document feeder 50 confirms which of the normal mode and the mixed loading mode has been selected, when the document feeder 50 starts feeding the document G. It should be noted that the mode selector 71 may receive selection of a mode from a user each time a document G is fed, or may set the document feeder 50 to the normal mode by default and select the mixed loading mode upon receiving such an input from a user. If it is determined that the mixed loading mode has been selected (step S01: Yes), the process advances to step S06. If the mixed loading mode has not been selected (step S01: No), that is, if the normal mode has been selected, the process advances to step S02.

In step S02, the document sensors 60 detect the document G. Thereafter, the feeding determiner 72 receives results of the detection by the document sensors 60, acquires the detection time, and performs the skew determination.

In step S03, the feeding determiner 72 determines whether or not the difference in the detection time is less than or equal to a threshold value. Note here that the feeding determiner 72 performs the skew determination upon at least two document sensors 60 detecting the document G. If it is determined that the difference in the detection time is less than or equal to the threshold value, (step S03: Yes), the process advances to step S04. If it is determined that the difference in the detection time is greater than the threshold value, (step S03: No), the process advances to step S05.

In step S04, the feeding determiner 72 determines that the feeding is normal and allows the document G to continue to be fed. Thereafter, the feeding may be discontinued in a case where any abnormality is detected elsewhere, or the process may return to step S01 in a case where a new document G is to be fed after completion of the current feeding.

In step S05, the feeding determiner 72 determines that a skew has occurred and discontinues the feeding of the document G. In this case, the process may be stopped and an instruction to the user to remove the document G may be displayed on the display device.

In step S06, the document sensors 60 detect the document G. Thereafter, the feeding determiner 72 receives results of the detection by the document sensors 60 and performs the size determination.

In step S07, the feeding determiner 72 determines the size of the document G. In the size determination, as described above, the feeding determiner 72 distinguishes the size of the document G depending on which of the document sensors 60 has detected the document G. After the size determination, the feeding of the document G may continue as in step S04.

As described above, the feeding determiner 72 performs the skew determination when the normal mode has been selected and performs the size determination when the mixed loading mode has been selected. That is, the document sensors 60 are used for both the size determination and the skew determination. This configuration makes it possible to perform appropriate determinations according to the selected mode without increasing the number of document sensors 60.

Second Embodiment

The following describes an image forming apparatus according to a second embodiment of the present invention with reference to the accompanying drawings.

The second embodiment has a configuration that is different from the first embodiment in the flow of the process to be performed when the mixed loading mode has been selected. It should be noted that the second embodiment has substantially the same configuration as the first embodiment illustrated in FIGS. 1 to 8, and therefore only differences therebetween will be described and other details will be omitted.

Figure 9:
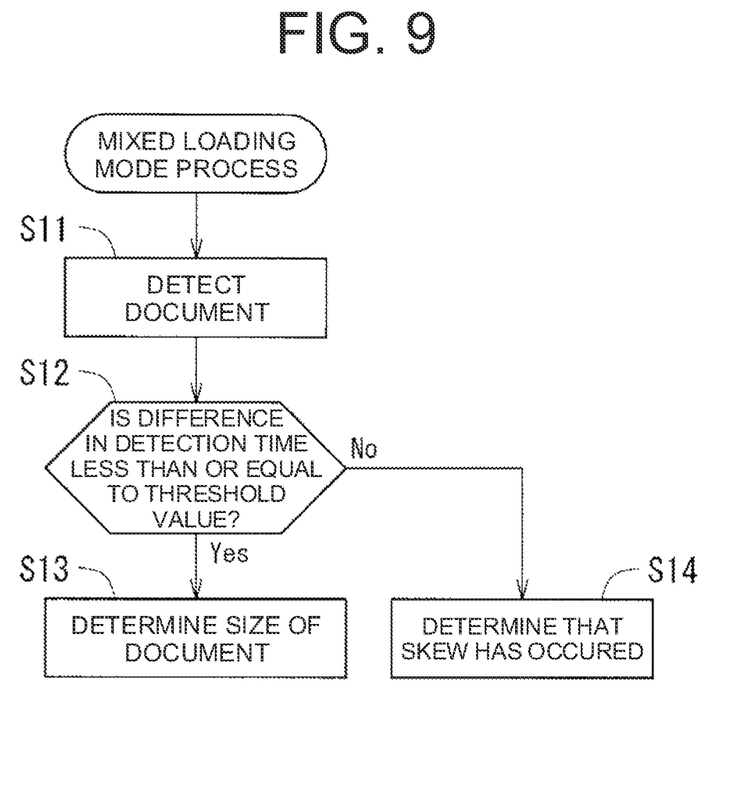
FIG. 9 is a flow chart showing a flow of a process to be performed when a mixed loading mode has been selected in a document feeder according to a second embodiment of the present invention.

FIG. 9 is a flow chart showing the flow of the process to be performed when the mixed loading mode has been selected in the document feeder 50 according to the second embodiment of the present invention.

In FIG. 9, the document feeder 50 is in an initial state when it is determined in step S01 in the flow of the process shown in FIG. 8 that the mixed loading mode has been selected (step S01: Yes). That is, step S11 in FIG. 9 is performed instead of step S06 in FIG. 8. It should be noted that the same process as in the first embodiment is performed when the normal mode has been selected (step S01: No), and therefore description thereof will be omitted.

In step S11, the document sensors 60 detect a document G. Thereafter, the feeding determiner 72 receives results of the detection by the document sensors 60, acquires the detection time, and performs the skew determination. That is, in the second embodiment, the skew determination is performed even when the mixed loading mode has been selected.

In step S12, as in step S03, the feeding determiner 72 determines whether or not the difference in the detection time is less than or equal to a threshold value. If it is determined that the difference in the detection time is less than or equal to the threshold value, (step S12: Yes), the process advances to step S13. If it is determined that the difference in the detection time is greater than the threshold value, (step S12: No), the process advances to step S14.

Note here that the threshold value in the skew determination for the mixed loading mode may be different from that in the skew determination for the normal mode. Since documents G having different sizes are loaded in the case of the mixed loading mode, an edge of a document G having a smaller size can fail to be in contact with the document guide 57. Such a document G therefore tends to be skewed more easily in the mixed loading mode than in the normal mode. Tolerating feeding with a slight skew allows the process to be smooth. Accordingly, a larger skew threshold value to may be adopted in the mixed loading mode than in the normal mode.

In step S13, as in step S07, the feeding determiner 72 determines the size of the document G and allows the document G to continue to be fed.

In step S14, as in step S05, the feeding determiner 72 determines that a skew has occurred and discontinues the feeding of the document G.

In the second embodiment, as described above, the skew determination is performed as well as the size determination when the mixed loading mode has been selected. Thus, it is possible to perceive whether or not the document G is being fed in a normal manner by performing the skew determination in the mixed loading mode.

It should be noted that the skew determination may be performed again if one of the document sensors 60 detects the document G and the other document sensors 60 detect the document G a little later. The skew determination may be repeated a plurality of times.

Third Embodiment

The following describes an image forming apparatus according to a third embodiment of the present invention with reference to the accompanying drawings.

The third embodiment has a configuration that is different from the first embodiment in the arrangement of the document sensors 60. It should be noted that the third embodiment has substantially the same configuration as the first embodiment and the second embodiment illustrated in FIGS. 1 to 9, and therefore only differences therebetween will be described and other details will be omitted.

Figure 10:
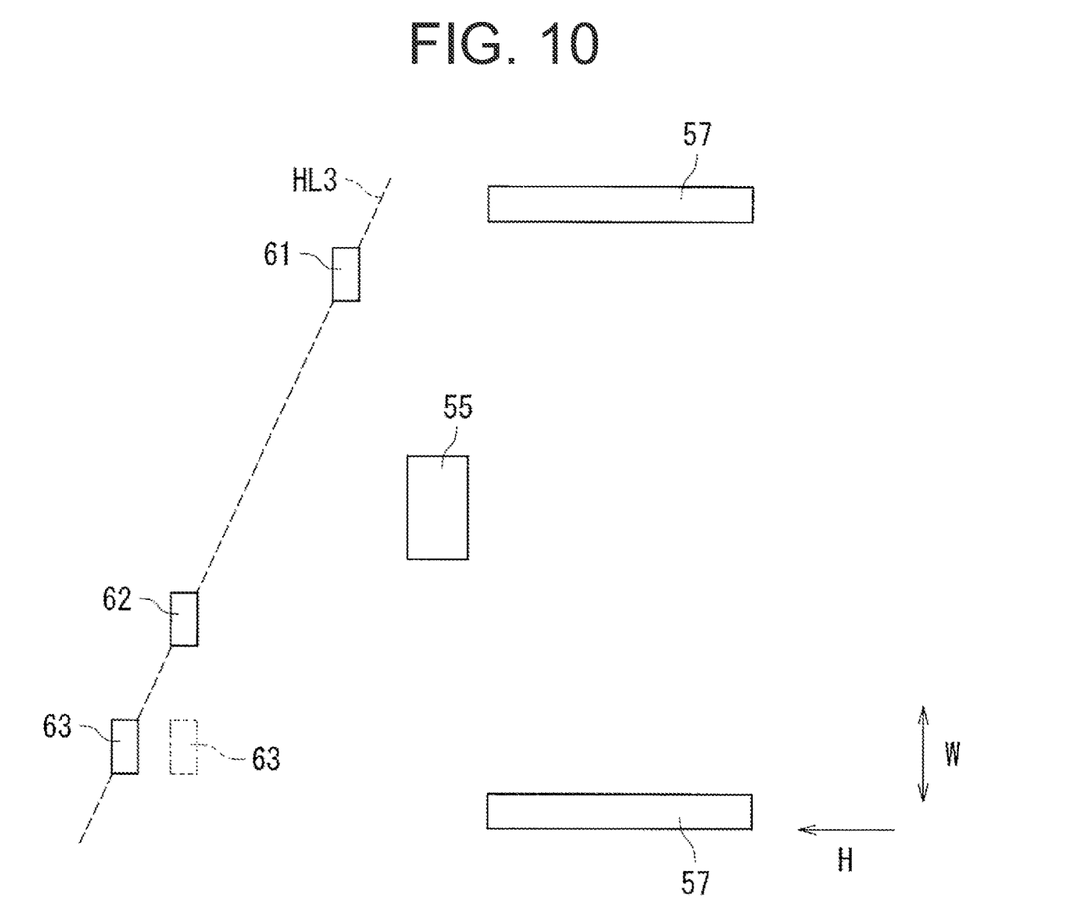
FIG. 10 is a schematic explanatory diagram illustrating an arrangement of document sensors in a document feeder according to a third embodiment of the present invention.

FIG. 10 is a schematic explanatory diagram illustrating an arrangement of document sensors in a document feeder 50 according to the third embodiment of the present invention. It should be noted that in consideration of drawing legibility, FIG. 10, which illustrates the paper sheet feeding roller 55 and the vicinity thereof, selectively shows the document sensors 60 and the document guides 57 and omits the other components.

The document sensors 60 are disposed in positions that are different in the feeding direction H and arranged along a third auxiliary line HL3 at an angle relative to the width direction W. In the case of such an arrangement, the feeding determiner 72 corrects the detection time taken to detect the document by each of the document sensors 60 based on the positions of the document sensors 60 in the feeding direction H. The feeding speed of the document G can be adjusted by adjusting the rotational speed of the paper sheet feeding roller 55. It is therefore possible to easily estimate the time when the leading edge of the document G is to arrive at each document sensor 60 by considering the distance the document G moves forward at the feeding speed. This configuration increases design flexibility through the positions of the document sensors 60 varying in the feeding direction H. Furthermore, correcting the detection time compensates for the variation in the positions in the feeding direction H, making it possible to easily determine whether or not the document G is being fed in a normal manner.

It should be noted that the document sensors 60 are not limited to the above-described arrangement and do not have to be arranged on a straight line. FIG. 10 shows, as a modification example, an arrangement in which the third document sensor 63 is disposed in a position out of the third auxiliary line HL3 using a dashed and dotted line. In the modification example, the second document sensor 62 and the third document sensor 63 are disposed in positions that overlap in the feeding direction H, and only the first document sensor 61 is disposed in a position that is different in the feeding direction H.

It should be noted that the embodiments disclosed herein are exemplary in all aspects, and are not intended to be construed as a basis of limiting interpretation. The technical scope of the present invention is not intended to be understood based only on the embodiments described above, and is intended to be defined by the following claims. The technical scope of the present invention includes all variations that are equivalent in meaning and scope to the claims.

What is claimed is:

1. A document feeder that feeds a document on a paper sheet feeding tray, the document feeder comprising:
    a mode selector that receives selection of either a normal mode for feeding documents having a same size or a mixed loading mode for feeding documents having different sizes;
    at least two document sensors that detect the documents, the document sensors being arranged at an interval in a width direction of the documents; and
    a feeding determiner that performs, based on results of the detection by the document sensors, a size determination to determine a size of a document being fed and a skew determination to determine whether or not the document being fed is skewed, wherein
    the feeding determiner performs the skew determination when the normal mode has been selected, and performs the skew determination as well as the size determination when the mixed loading mode has been selected, and
    the feeding determiner performs the skew determination by adopting a threshold value for the normal mode and a different threshold value for the mixed loading mode and, when determining that a skew has occurred, discontinues feeding of the document.

2. The document feeder according to claim 1, wherein in the skew determination, the threshold value for the mixed loading mode is larger than the threshold value for the normal mode.

3. The document feeder according to claim 1, wherein the feeding determiner acquires a detection time taken to detect the document being fed by each of the document sensors, and
    the document being fed is determined to be skewed in the skew determination if a difference in the detection time detected by the document sensors is greater than a threshold value.

4. The document feeder according to claim 1, wherein in the size determination, the size of the document being fed is distinguished in accordance with a plurality of levels based on a position of any of the document sensors that has detected the document.

5. The document feeder according to claim 1, wherein the document sensors are arranged on a straight line extending in the width direction.

6. The document feeder according to claim 1, wherein the document sensors are disposed in positions that are different in a feeding direction of the documents, and
    the feeding determiner acquires a detection time taken to detect the document being fed by each of the document sensors and corrects the detection time based on the positions of the document sensors in the feeding direction.

7. An image forming apparatus comprising the document feeder according to claim 1.

* * * * *